United States Patent [19]

Schrader

[11] 4,103,430

[45] Aug. 1, 1978

[54] VIEWING DEVICE FOR A BUBBLE LEVEL

[76] Inventor: Joseph F. Schrader, 22 Pearl St., New Hartford, N.Y. 13413

[21] Appl. No.: 829,443

[22] Filed: Aug. 31, 1977

[51] Int. Cl.² .............................................. G01C 9/32
[52] U.S. Cl. ........................................ 33/348; 362/84
[58] Field of Search ................... 33/348, 348.2; 362/84

[56] References Cited

U.S. PATENT DOCUMENTS

| 2,639,514 | 5/1953 | Garrison | 33/348 |
| 3,064,535 | 11/1962 | Anderson | 33/348 |
| 3,300,867 | 1/1967 | Sampson | 33/348 |
| 3,368,287 | 2/1968 | Ault | 33/348 |
| 3,862,500 | 1/1975 | Wibom | 33/348 |

*Primary Examiner*—Charles E. Phillips
*Attorney, Agent, or Firm*—Bruns & Jenney

[57] ABSTRACT

A viewing device for use in conjunction with a level of the type having a see through bubble housing comprising two opposed windows and a bubble chamber situated therebetween. The device includes a base containing a luminescent panel that is arranged to seat in contact against one of the bubble housing windows whereby the panel illuminates the bubble chamber, a post perpendicularly secured to the base and extending upwardly beyond the other bubble housing window and a light shield slidably mounted upon the post and being arranged to seat in locking engagement against the other bubble window, the light shield containing a viewing aperture through which the bubble chamber can be seen and a mirror adjustably supported in the shield to permit off axis reading of the bubble.

8 Claims, 4 Drawing Figures

VIEWING DEVICE FOR A BUBBLE LEVEL

BACKGROUND OF THE INVENTION

This invention relates to a viewing device for use in conjunction with a bubble level and, in particular, to a device to enable the user to accurately read a bubble level from any off axis position under adverse lighting conditions.

It is well known in the art that a serious lack of contrast is present when a worker is attempting to read a bubble level indicator as conventionally found in a spirit level or the like. Most levels of this nature commonly contain a bubble column or chamber constructed with alcohol, chloroform, ether or other such colorless liquid which is difficult to discern when the lighting is less than optimum. Adverse lighting conditions can involve overexposure of the bubble region due to direct intense sunlight or more typically insufficient lighting owing to poor weather or a dark confined working area. Working in a confined space can also increase the chances of making a reading error in that the level user is oftentimes forced to view the instrument at less than an optimum reading angle.

As exemplified by U.S. Pat. No. 2,344,241 to Flint, some attempts have been made towards improving the lighting in and about the bubble region of the level, however, little consideration has been given to the problems associated with reading the level at an undesirable off axis angle. In Flint the level is provided with both a lamp and luminescent strips that are applied about the borders of the bubble chamber.

SUMMARY OF THE INVENTION

It is therefore an object of the present invention to improve bubble levels by providing for greater readability under all types of conditions.

Another object of the present invention is to provide a simple attachment for use in conjunction with a spirit level for illuminating the bubble region of the level and also allowing the instrument to be accurately read at off axis reading angles.

A further object of the present invention is to provide a simple, compact device that can be conveniently attached to a bubble level which serves to extend the useful service of the instrument.

These and other objects of the present invention are attained by means of a device for extending the readability of a bubble level of the type having a bubble chamber positioned between opposed viewing windows, the device including a base being arranged to seat in contact against one of the bubble housing windows and having a luminescent panel contained therein, a post perpendicularly affixed to the base and extending upwardly beyond the opposite bubble housing window, a light shield slidably mounted upon the post and being arranged to move into seating contact against the opposite bubble housing window, the light shield further including a central viewing aperture therein through which the bubble chamber may be seen and a mirror adjustably supported therein to allow the bubble to be read accurately from a number of different viewing positions.

BRIEF DESCRIPTION OF THE DRAWINGS

For a better understanding of the present invention as well as other objects and further features thereof, reference is had to the following detailed description of the invention to be read in conjunction with the accompanying drawings, wherein.

DESCRIPTION OF THE PREFERRED EMBODIMENT

Figure 1:
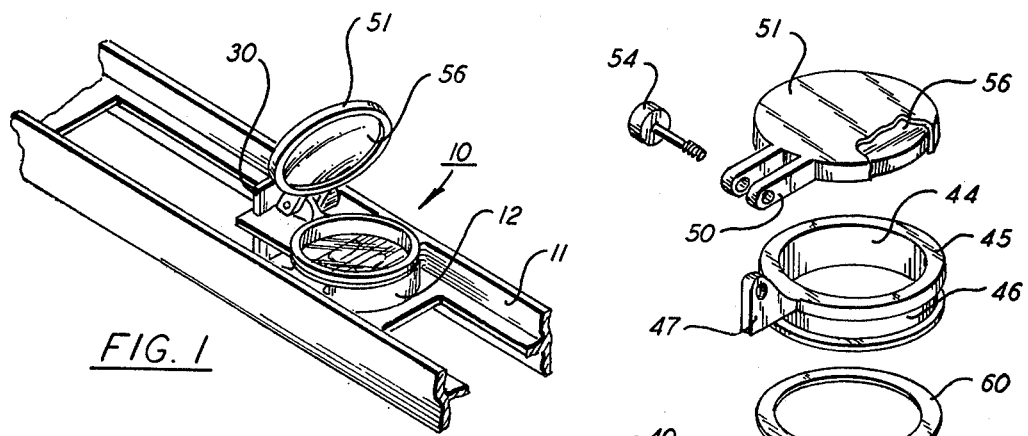
FIG. 1 is a partial view in perspective showing the viewing device of the present invention used in conjunction with a spirit level.
Figure 3:
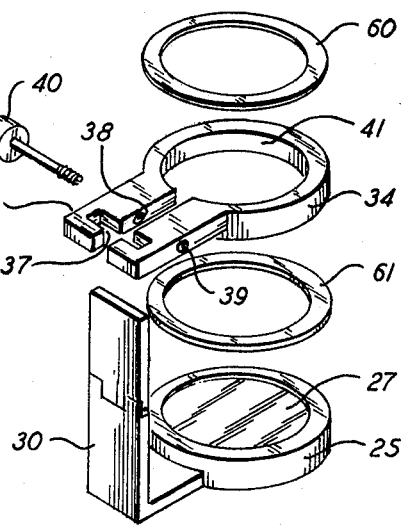
FIG. 3 is an exploded view showing the component parts of the viewing device of the present invention.
Figure 2:
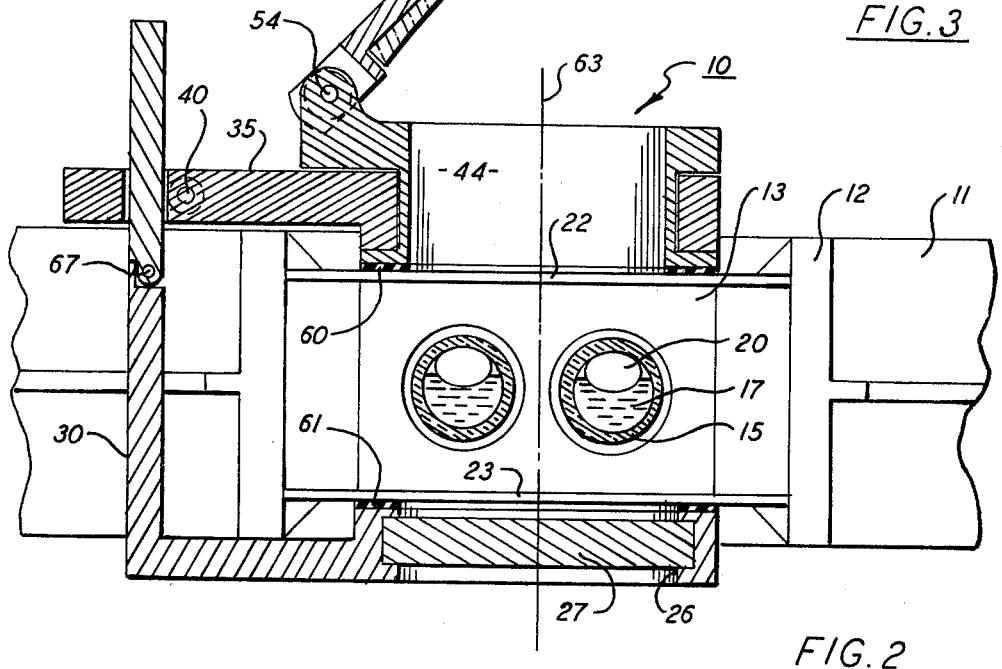
FIG. 2 is a side elevation is section illustrating the mounting of the viewing device over the bubble housing of the level shown in FIG. 1.

Referring initially to FIGS. 1, 2 and 3 of the drawings, there is shown a viewing device generally referenced 10 for extending the readability, and thus usability of a bubble level and which embodies the teachings of the present invention. In this particular embodiment the device is used in conjunction with a carpenter's level 11, or the like. However, it should be clear that the device is not necessarily limited to this specific application and it can be employed in any number of similar applications. As illustrated, level 11, is of metal construction having one or more islands 12 formed therein which are supported a bubble chamber 13. Included within the chamber are two transparent bubble containers 15 of tubular construction containing a liquid 17 of any suitable form in which a levelling bubble 20 is established. Although not shown, the tubular bubble containers may be etched with a scale that indicates the bubbles' relative position within the chamber.

As is conventional in this type of level construction, the bubble chamber is mounted between two opposed parallel windows 22, 23 made of glass or other light transmitting material. In order to prevent scratching or breaking, the windows are recessed below the upper and lower end faces of the island 12. The two windows cooperate to permit a maximum amount of available light to pass through the bubble chamber and also allows for reading of the level from either side of the instrument.

As noted above, the liquid in the bubble chamber, the bubble or meniscus itself and the surrounding atmosphere are all phase objects and thus provide little contrast by which the user might read the exact bubble location. When the instrument is read under marginal lighting conditions or where the user cannot view the bubble chamber window directly along the central axis of the chamber, as for example when using the level in a restricted working area or the like, the margin for error is greatly increased and the overall accuracy of the instrument thus decreased. As will become apparent from the disclosure below, the present invention overcomes these difficulties in a simple and convenient manner.

The apparatus of the present invention includes an annular base member 25 having a central opening 26 passing therethrough in which is mounted a luminescent disc or panel 27. The luminescent disc may be formed of any suitable light emitting material capable of illuminating the bubble chamber of the level when brought in close proximity therewith. A translucent disc treated with a phosphor has been found to perform well when used in association with the present invention. In practice, the luminescent disc 27 is carried within an annular groove formed in the side wall of opening 26.

A vertically extended post 30 is dependent upon the base 25 (FIG. 2). The post is a L-shaped member having a horizontally turned leg of sufficient length so that the vertically extended body of the post reaches beyond the bubble chamber support structure and the top margin of the level.

In assembly, an annular support member 34, having a dependent laterally extended split flange 35 mounted thereon, is slidably supported upon the post via a rectangular slotted opening 37 formed in the flange. A thumb 40 screw is passed through clearance hole 38 formed in one side of the split flange and is threaded into tapped hole 39 formed in the other side thereof. By tightening the thumb screw 40 in the flange, sufficient pressure is exerted by the flange against the post to lock the support member in a fixed position in assembly.

A tube like light shield 45 is rotatably supported within the cylindrical opening 41 formed in support member 34 by means of an annular groove 46 established in the outer wall of the light shield. A clear central aperture passes through the shield and provides a viewing chamber 44. It is contemplated that both the support member 34 and the light shield 45 are to be fabricated of a plastic material having a low coefficient of friction whereby the light shield can be freely rotated 360° within opening 41 provided in the support member. A dependent hinge post 47 is carried upon the upper side wall of the light shield which is arranged to pivotably receive hinge section 50 of cover 51 therein. The cover is supported upon the hinge post by means of a pivot pin 54 that is threaded into the hinge section. A circular concave mirror 56 is mounted within the inside surface of the cover 51 to provide for off axis viewing of the bubble region through aperture 44 of the light shield.

A pair of resilient rubber like gaskets 60, 61 are cemented or otherwise secured be any suitable means to the inner end faces of both the base element 25 and the light shield 45.

In operation, the bubble viewing device 10 is mounted upon the levelling instrument 11 by first seating the gasket bearing end face of the base in contact against one of the windows of the bubble housing. This places the luminescent disc in close proximity with the bubble tubes as shown in FIG. 2. With the base properly seated against the window, the post 30 extends upwardly beyond the top margin of the level. The annular support member 34, with the light shield rotatably mounted therein, is then slipped over the free end of the post via slotted groove 37 and brought down until the gasket bearing end face of the light shield is seated against the other window of the bubble housing. Because the post and the slotted groove 37 are both rectangular in form, all the cojoined elements can be conveniently located for coaxial alignment in assembly along axis 63. By exerting a slight deforming pressure against the resilient gaskets prior to tightening down on the thumb screw 40, the entire assembly can be clamped in place against the level.

When utilized to improve the reading of the level in a relatively dark and confined space, the level is first positioned in the desired location and the mirror's position adjusted to enable the level user to see the bubble region. To adjust the mirror, the light shield is first rotated within the support so as to position the hinge post directly along the line of sight of the viewer. Next the mirror is rotated upwardly about the pivot pin to permit the viewer to view the bubble region along the central axis of the mirror. The mirror is locked in the desired viewing position by simply tightening down the threaded pivot pin 54. As can be seen, the mirror is thus provided with two degrees of freedom which enables the bubble chamber to be seen be a viewer stationed anywhere about the level. As noted above, the mirror is concave in form and, although reducing the image size slightly, serves to clearly focus the bubble image in the range of vision of the viewer to produce a clear shape image.

The light emitting properties of the luminescent disc are matched with the area of the central viewing aperture 444 so as to provide effective illumination of the bubble chamber regardless of ambient lighting conditions. As can be seen, when the lighting is poor, the light shield functions to contain the disc generated illumination within the primary viewing region. On the other hand, if the ambient light is overly intense, the light shield again can be employed to protect the viewing region from the disturbing effects of the intense illumination while, at the same time, the luminescent disc clearly defines the bubble area.

Figure 4:
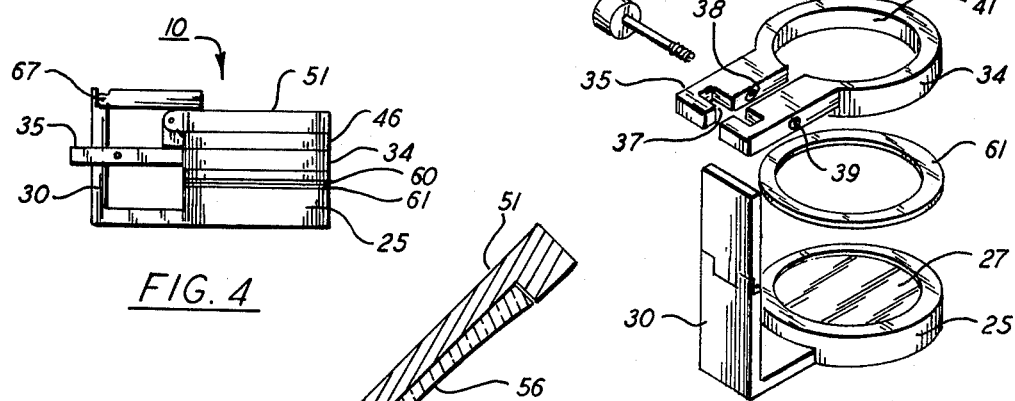
FIG. 4 is a view illustrating the viewing device of the present invention folded for storage.

Referring now to FIG. 4, the viewing device is shown removed from the level and folded for storage in a tool box or the like. To store the device, the two gasketed end faces of the base and light shield, respectively, are brought into a butting contact with each other and the post collapsed over the closed cover of the light shield (as shown) to provide a compact unit. To accommodate folding, post 30 is provided with a lock hinge 67 that is adapted to lock the post in an upright position as shown in FIG. 2 or in a folded position as shown in FIG. 4.

While the invention has been described with reference to the structure disclosed herein, it is not confined to the details set forth, and this application is intended to cover such modifications or changes as may come within the scope of the following claims.

I claim:

1. Apparatus for use in conjunction with a bubble level of the type having at least one bubble indicator mounted between two opposed windows of a bubble housing, the apparatus including a base member, containing a luminescent panel therein, being arranged to seat in contact against one of the windows of the bubble housing whereby the panel illuminates the bubble region, a post affixed normal to the base and extending upwardly beyond the opposite window of the bubble housing, a light shield having a central aperture therein slidably mounted upon the post and being arranged to be moved into seating contact against the opposite window of the bubble window whereby the bubble indicator is readable through said aperture, and a viewing mirror adjustably pivotally mounted upon said light shield so that the illuminated bubble region within said aperture is viewable through said mirror.

2. The apparatus of claim 1 wherein said light shield includes a support member slidably mounted upon said post and a cylindrical element supported for rotation about its central axis within said support member, the central opening in said cylinder forming the aperture of the light shield.

3. The apparatus of claim 2 wherein said mirror is supported on the inner face of a cover that is pivotably mounted in the side wall of the light shield cylinder.

4. The apparatus of claim 3 wherein said mirror is concave in form.

5. The apparatus of claim 2 further including a second locking means operatively associated with said cover for locking the cover in a fixed position in relation to said aperture.

6. The apparatus of claim 2 further including locking means operatively associated with the support member to lock said support member against said post.

7. The apparatus of claim 1 further including a first resilient gasket supported upon the base and being arranged to seat in contact against one of said windows of the bubble housing and a second resilient gasket supported upon the light shield and being arranged to seat in contact against the opposite window of said bubble housing.

8. The apparatus of claim 1 wherein said post is hinged so that the post is foldable over the light shield to form a compact structure for storage.

* * * * *